US012206300B2

(12) United States Patent
Fukumoto et al.

(10) Patent No.: US 12,206,300 B2
(45) Date of Patent: Jan. 21, 2025

(54) METHOD FOR ARRANGING AN ELECTRIC MACHINE ON A TRANSMISSION (71) Applicant: Vitesco Technologies Germany GMBH, Regensburg (DE)

(72) Inventors: Isao Fukumoto, Berlin (DE); Matti Radwainski, Berlin (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 392 days.

(21) Appl. No.: 17/675,021

(22) Filed: Feb. 18, 2022

(65) Prior Publication Data
US 2022/0173643 A1 Jun. 2, 2022

Related U.S. Application Data (63) Continuation of application No. PCT/EP2020/073148, filed on Aug. 19, 2020.

(30) Foreign Application Priority Data

Aug. 21, 2019 (DE) ...................... 10 2019 212 534.4

(51) Int. Cl.
*H01F 7/06* (2006.01)
*H02K 5/15* (2006.01)
(Continued)

(52) U.S. Cl.
CPC ............... *H02K 15/14* (2013.01); *H02K 5/15* (2013.01); *H02K 5/1735* (2013.01); *H02K 7/003* (2013.01); *H02K 7/085* (2013.01); *H02K 7/116* (2013.01)

(58) Field of Classification Search
CPC ........... H02K 5/028; H02K 5/14; H02K 5/15; H02K 5/1735; H02K 5/1737; H02K 7/003;
(Continued)

(56) References Cited

U.S. PATENT DOCUMENTS

| 6,253,437 B1 | 7/2001 | Levin |
| 6,842,967 B2 * | 1/2005 | Wingeier ................ B23P 19/10 |
| | | 29/736 |
| 6,981,478 B2 | 1/2006 | Schafer et al. |

(Continued)

FOREIGN PATENT DOCUMENTS

| CN | 1663098 A | 8/2005 |
| CN | 108696025 A | 10/2018 |

(Continued)

OTHER PUBLICATIONS

Chinese Office Action dated Jan. 15, 2024 for corresponding Patent Application No. 202080059059.1.

(Continued)

*Primary Examiner* — Paul D Kim (57) ABSTRACT

A method for arranging an electric machine on a transmission, having the steps of providing a stator housing, inserting a hollow cylindrical stator into the stator housing such that the stator is rotationally fixed in the stator housing, and aligning the stator housing with the transmission. Additional steps include securing the stator housing on the transmission, inserting a rotor having a rotor hollow shaft into the stator, securing the rotor to a transmission input shaft, placing a bearing shield having a bearing pin on a receiving opening of the stator housing such that the bearing pin engages in a rotor cavity of the rotor hollow shaft and in a pivotally attached bearing device arranged in the rotor cavity such that the rotor is mounted so as to be rotatable about the rotor longitudinal axis.

11 Claims, 7 Drawing Sheets (51) Int. Cl.
    *H02K 5/173*     (2006.01)
    *H02K 7/00*     (2006.01)
    *H02K 7/08*     (2006.01)
    *H02K 7/116*     (2006.01)
    *H02K 15/14*     (2006.01)

(58) Field of Classification Search
    CPC ........ H02K 7/006; H02K 7/085; H02K 7/086; H02K 7/088; H02K 7/116
    See application file for complete search history.

(56) References Cited

U.S. PATENT DOCUMENTS

| | | | |
|---|---|---|---|
| 8,610,323 B2 * | 12/2013 | Himmelmann | H02K 15/0006 310/90 |
| 10,527,143 B2 * | 1/2020 | Wurzberger | F16H 1/28 |
| 11,173,537 B2 | 11/2021 | Suzuki | |
| 2005/0104461 A1 | 5/2005 | Hatz | |
| 2020/0244138 A1 | 7/2020 | Frohlich et al. | |

FOREIGN PATENT DOCUMENTS

| | | |
|---|---|---|
| DE | 10007262 A1 | 9/2000 |
| DE | 10248355 A1 | 4/2004 |
| DE | 102006028200 A1 | 12/2007 |
| DE | 102012100190 A1 | 7/2013 |
| DE | 102012112806 A1 | 6/2014 |
| DE | 102016222815 A1 | 5/2018 |
| DE | 102017218350 A1 | 4/2019 |
| EP | 2093863 A1 | 8/2009 |
| EP | 3517460 A1 | 7/2019 |
| FR | 965860 A | 9/1950 |

OTHER PUBLICATIONS

Kampker, Achim; Elektromobilproduktion, 2014.
Matuszewski, Heinrick; Handbuch—Vorrichtungen—Konstruktion und Einsatz, 1986.
Wittel, Herbert, et al.; Roloff/Matek Maschinenelemente—Normung, Berechnung, Gestaltung, 2017.

* cited by examiner

METHOD FOR ARRANGING AN ELECTRIC MACHINE ON A TRANSMISSION

CROSS-REFERENCE TO RELATED APPLICATIONS

This application claims priority to PCT Application PCT/EP2020/073148, filed Aug. 19, 2020, which claims priority to German Patent Application No. DE 10 2019 212 534.4, filed Aug. 21, 2019. The disclosures of the above applications are incorporated herein by reference.

FIELD OF THE INVENTION

The invention concerns a method for arranging an electric machine on a transmission, wherein the electric machine is arranged on the transmission such that a reduced air gap between a rotor and a stator of the electric machine is achieved. In this way, the power density of the electric machine is increased. The invention also concerns a drive device with a transmission and an electric machine, wherein the electric machine is arranged on the transmission by the method according to the invention.

BACKGROUND OF THE INVENTION

Electric machines for at least partially electrically driven motor vehicles are known in principle. Such electric machines are subject to high stresses because of the high rotation speeds of over 12,000 rpm. Also, such electric machines should be quiet so that third parties—or also the driver—are not unnecessarily disturbed by the noise of the electric motor. A further aim is to construct the electric machine as lightweight as possible so that the overall performance of the motor vehicle can be increased. The aim of weight-saving on the electric machine may lead to components of the electric machine, in particular the rotor shaft, being designed more delicately and hence with a higher elasticity.

In addition, an aim is to achieve maximum possible power densities, which leads to minimizing the air gap between the rotor and the stator of the electric machine. This may however be problematic if, because of weight savings, the rotor has a higher elasticity. One object is therefore to optimize the arrangement of the electric machine on the transmission such that tolerances between a transmission input shaft and the rotor shaft of the rotor are reduced and/or compensated in order to minimize the air gap between the stator and rotor.

SUMMARY OF THE INVENTION

It is therefore the object of the invention to provide a method for arranging an electric machine on a transmission which allows a reduced air gap between the rotor and the stator of the electric machine.

This object is achieved by the subject matter described. Developments of the invention are specified in the following description and the drawings, wherein each feature may constitute an aspect of the invention both individually and in combination.

According to the invention, a method is provided for arranging an electric machine on a transmission, having the steps of:

providing a stator housing which has at least one cylindrical inner casing surface and a receiving opening;

inserting a hollow cylindrical stator into the stator housing such that the stator is rotationally fixed in the stator housing;

inserting a centering pin into a stator cavity of the hollow cylindrical stator via the receiving opening of the stator housing, and clamping the centering pin in the stator cavity;

aligning the stator housing on the transmission such that a longitudinal axis of a transmission input shaft mounted in the transmission is oriented coaxially to the longitudinal direction of the centering pin arranged in the stator;

securing the stator housing on the transmission;

removing the centering pin from the stator cavity;

inserting a rotor having a rotor hollow shaft into the stator;

securing the rotor to the transmission input shaft; and placing a bearing shield having a bearing pin on the receiving opening of the stator housing, wherein the bearing pin engages in a rotor cavity of the rotor hollow shaft and in a pivotally attached bearing device arranged in the rotor cavity, such that the rotor is mounted so as to be rotatable about the rotor longitudinal axis.

In other words, it is an aspect of the present invention to provide a method for arranging an electric machine on a transmission, wherein firstly a stator housing is provided which has a cylindrical inner casing surface. Also, the stator housing includes a receiving opening, wherein the receiving opening is in an embodiment formed in the axial direction relative to a longitudinal axis of the stator housing.

A hollow cylindrical stator is arranged in the stator housing. In an embodiment, this may be inserted in the stator housing via the receiving opening and be rotationally fixedly connected thereto. In an embodiment, the stator is pressed into the stator housing so as to create a rotationally fixed connection to the stator housing. Rotationally fixed indicates that during operation of the electric machine, the stator does not undergo any shift or twist in the circumferential direction relative to the stator housing.

After the stator has been arranged in the stator housing, a centering pin is introduced into a stator cavity of the hollow cylindrical stator via the receiving opening of the stator housing, and is clamped therein. Clamping takes place in such a fashion that a diameter of the centering pin is enlarged at least in portions.

Then the stator housing is placed on the transmission, wherein the longitudinal axis of a transmission input shaft mounted in the transmission is oriented coaxially to the longitudinal direction of the centering pin arranged in the stator. Precise alignment is a first step in reducing the air gap between the rotor and stator. After precise alignment, the stator housing is secured or fixed to the transmission. This takes place by force fit via corresponding connecting bolts or screws.

After the stator housing has been fixed to the transmission, the centering pin is removed from the stator cavity. This releases the clamping of the centering pin. This is associated with a reduction in diameter of the centering pin, so that this can easily be removed from the stator cavity.

In a further step, a rotor having a rotor hollow shaft is inserted in the stator cavity and connected to the transmission input shaft. Because the rotor is formed as a hollow shaft, this may have a reduced weight. The rotor is secured to the transmission input shaft via a screw connection.

After the rotor has been secured to the transmission input shaft, a bearing shield is placed on the receiving opening of the stator in order to close this. The bearing shield has a bearing pin which protrudes into a rotor cavity of the rotor hollow shaft and engages in a pivotally attached bearing device arranged in the rotor cavity, such that the rotor is mounted so as to be rotatable about the rotor longitudinal axis. Production-induced tolerances or slight deviations from the longitudinal direction between the bearing pin and the transmission input shaft may be compensated via the pivotally attached bearing device, so that the air gap between the rotor and stator is reduced. Also, this compensation may reduce undesirable noise in operation of the electric machine and extend the service life of the electric machine.

The rotor hollow shaft is cast and/or molded onto a hollow cylindrical sheet stack of the rotor. A rotor hollow shaft cast onto the sheet stack is in an embodiment made of an aluminum casting compound. A rotor hollow shaft molded onto the sheet stack is made of an aluminum alloy. The molded rotor hollow shaft is in an embodiment a forged rotor hollow shaft which is molded on the rotor via a forging tool and hence connected rotationally fixedly to the sheet stack. A forged rotor hollow shaft, in contrast to a cast rotor hollow shaft, may have increased stiffness or reduced elasticity, whereby the air gap between the rotor and stator may be reduced.

In principle, the stator is arranged in the stator housing such that it is rotationally fixed. Therefore, the stator does not undergo any twist in the circumferential direction of the stator relative to the stator housing during operation of the electric machine. In an embodiment of the invention, it is provided that the stator is pressed into the stator housing and/or connected to the stator housing by substance bonding. In this way, a secure, rotationally fixed connection between the stator and stator housing may be guaranteed.

In an embodiment of the invention, it is provided that before the alignment of the stator housing on the transmission, an end side of the stator housing facing away from the receiving opening is pushed onto a flange and connected rotationally fixedly thereto, such that a longitudinal axis of the stator is oriented perpendicularly to a flange face of the flange which faces the transmission when the stator housing is mounted on the transmission. In an embodiment, the flange face of the flange is oriented perpendicularly to the longitudinal axis of the transmission input shaft on mounting of the stator housing. By forming the flange and stator housing separately, a hollow cylindrical stator housing is created in a simple fashion. Then the flange, which may include fixing devices for fixing to the transmission, is arranged on the stator housing and connected thereto by force fit, form fit and/or substance bonding. It is thus possible to reduce the production costs of the stator housing.

In this context, an embodiment of the invention proposes that the flange and the stator housing are connected together by substance bonding. A substance-bonded connection may be an adhesive connection and/or a welded connection. During the substance-bonded connection of the flange to the stator housing, it must be ensured that the heat effect on the flange and on the stator housing is kept as low as possible, in order to avoid material weaknesses and/or material deformations of the stator housing and/or the flange.

According to an embodiment of the invention, it is proposed that to align the stator housing on the transmission, a protrusion formed on an axial end of the centering pin engages or is introduced into a recess of the transmission shaft, such that the longitudinal axis of the centering pin is oriented coaxially to the longitudinal axis of the transmission input shaft. The form fit of the centering pin with a recess in the transmission input shaft allows increased precision in centering of the stator housing on the transmission. This indicates that the air gap between the stator and the rotor, introduced into the rotor cavity following removal of the centering pin, is reduced. In this way, the power density of the electric machine is increased.

In principle, the centering pin may be introduced into the stator cavity and clamped such that this is arranged or configured positionally securely and centred in the stator cavity. In an embodiment of the invention, the centering pin is clamped in the radial direction against an inner casing surface of the stator cavity. The centering pin may be clamped by enlarging the diameter of the centering pin, wherein the outer casing surface of the centering pin is clamped at least in portions against the inner casing surface of the stator cavity. In this way, it is ensured that the longitudinal axis of the centering pin is substantially the same as the longitudinal axis of the cylindrical stator housing.

In an embodiment of the invention, it is proposed that the pivotally attached bearing device is inserted in the rotor via a hollow shaft opening which is formed on a side facing away from the transmission input shaft, and fixed securely in position via a securing ring. For this, a bearing seat is formed in the hollow shaft opening so that the bearing device may be arranged in the bearing seat. The bearing device is fixed in the axial direction via a securing ring.

According to a refinement of the invention, it is proposed that the bearing device includes a receiving ring and a bearing which is pivotally arranged in the receiving ring, wherein the bearing is arranged in the receiving ring via a translational movement and a pivot movement. In this way, in simple fashion a pivotal bearing is provided which may be produced at low cost.

Finally, an embodiment of the invention proposes that the bearing shield is connected to the housing by substance bonding and/or form fit.

The invention also concerns a drive device for an at least partially electrically driven motor vehicle, including a transmission with an electric machine arranged on the transmission, wherein the electric machine is arranged and aligned on the transmission by the method according to the invention.

Further features of the invention emerge from the following exemplary embodiments. The exemplary embodiments are not to be understood as restrictive, but rather as given by way of example. They are intended to enable a person skilled in the art to carry out the invention. The applicant reserves the right to make one or more of the features disclosed in the exemplary embodiments or to include such features. The exemplary embodiments are explained in more detail on the basis of Figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
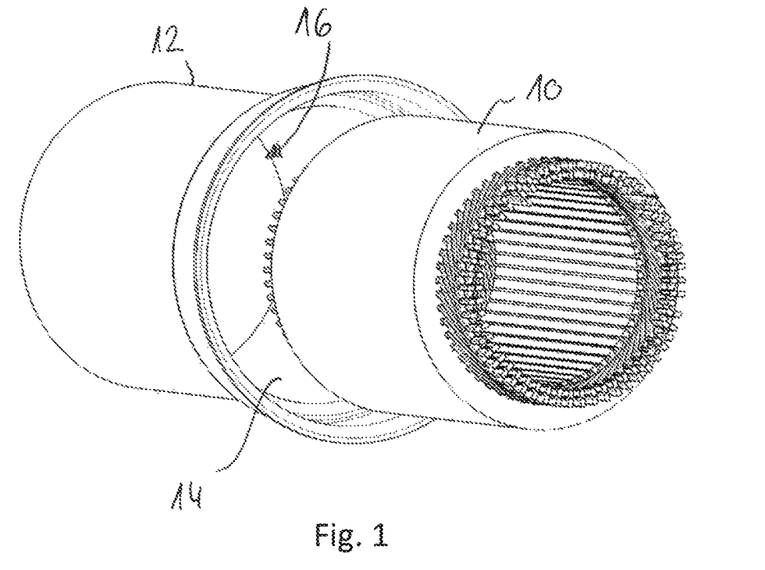
FIG. 1 shows an arrangement of a stator in a stator housing.

FIG. 1 shows how a hollow cylindrical stator 10 is inserted in a stator housing 12. The stator housing 12 has an inner casing surface 14 directed towards the inside in the radial direction. The stator housing 12 also has a receiving opening 16 which is formed in the axial direction of the cylindrical stator housing 12. The hollow cylindrical stator 10 is pressed into the receiving opening 16 of the stator housing 12 in the longitudinal direction of the stator housing 12, so that the stator 10 is arranged rotationally fixedly in the stator housing 12. Rotationally fixed indicates that the stator 10 cannot twist in the circumferential direction relative to the stator housing 12.

Figure 2:
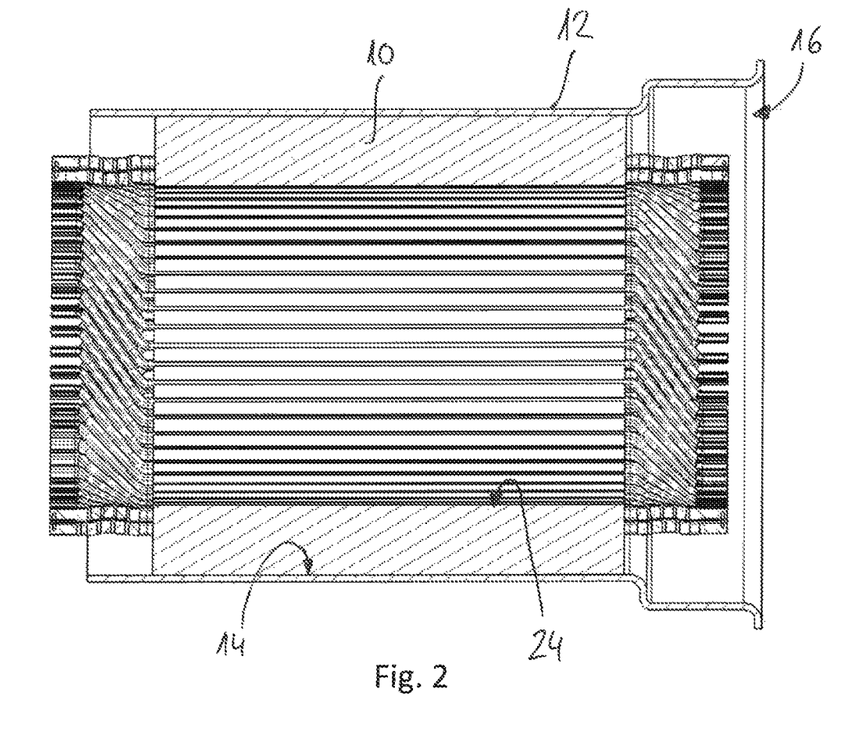
FIG. 2 shows a section through the stator housing in which the stator is arranged.
Figure 3:
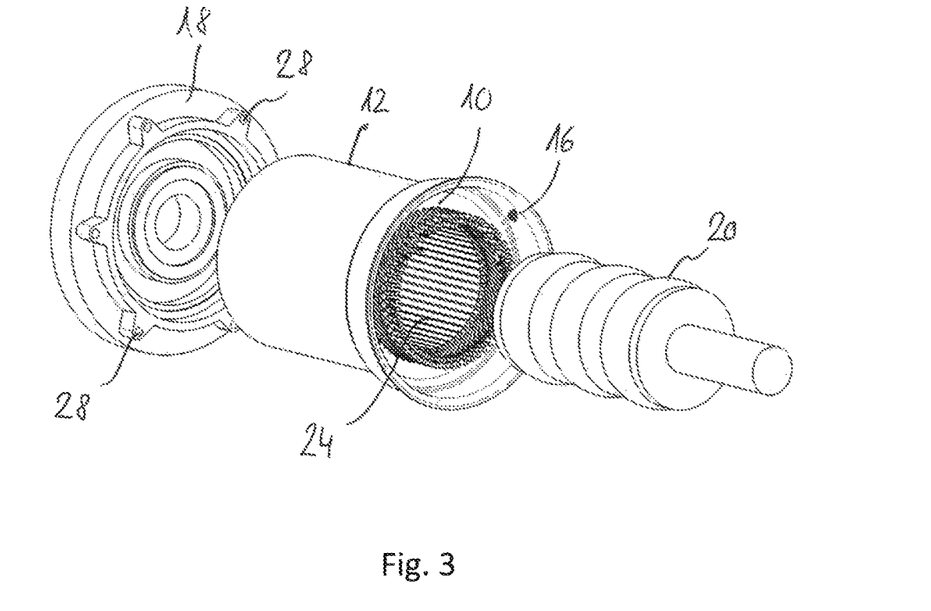
FIG. 3 shows a view of the stator housing for arrangement on a flange.

FIG. 2 shows a section through the stator housing 12 in which the stator 10 described in FIG. 1 is pressed.

FIGS. 3 to 6 show an arrangement of the stator housing 12 on a flange 18. For this, in a first step, a centering pin 20 is inserted in a stator cavity 22 of the hollow cylindrical stator 10 via the receiving opening 16 of the stator housing 12, and clamped against an inner casing surface 24 of the stator 10 which is directed towards the inside in the radial direction. In a second step, the stator housing 12 is pushed onto the flange 18.

Figure 4:
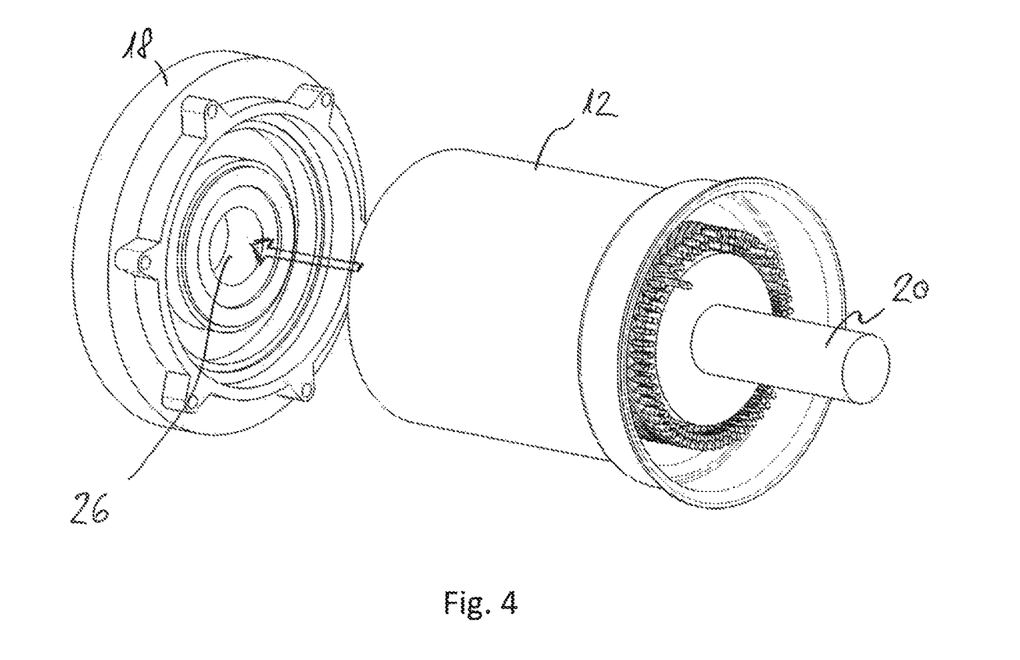
FIGS. 4 to 6 show a view of the stator housing with flange for arrangement on a transmission.

FIG. 4 shows that before the stator housing 12 is pushed onto the flange 18, first the centering pin 20 is inserted and clamped in the stator cavity 22. On a side facing the flange 18, the centering pin 20 has a protrusion 40 which protrudes through the flange 18 or may be introduced through an opening 26 inside the flange 18 in order to centre the flange 18 on the stator housing 12.

Figure 5:
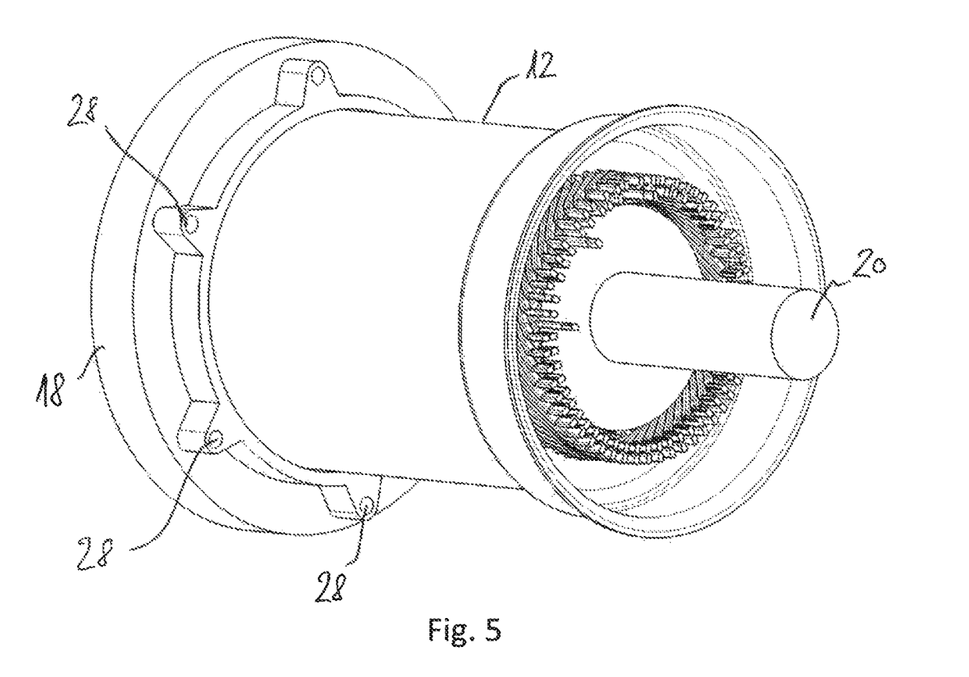

FIG. 5 shows how the stator housing 12 is pushed onto the flange 18. The flange 18 has a plurality of fixing openings 28 through which a fixing device 38 may be introduced and connected to a transmission 30.

Figure 6:
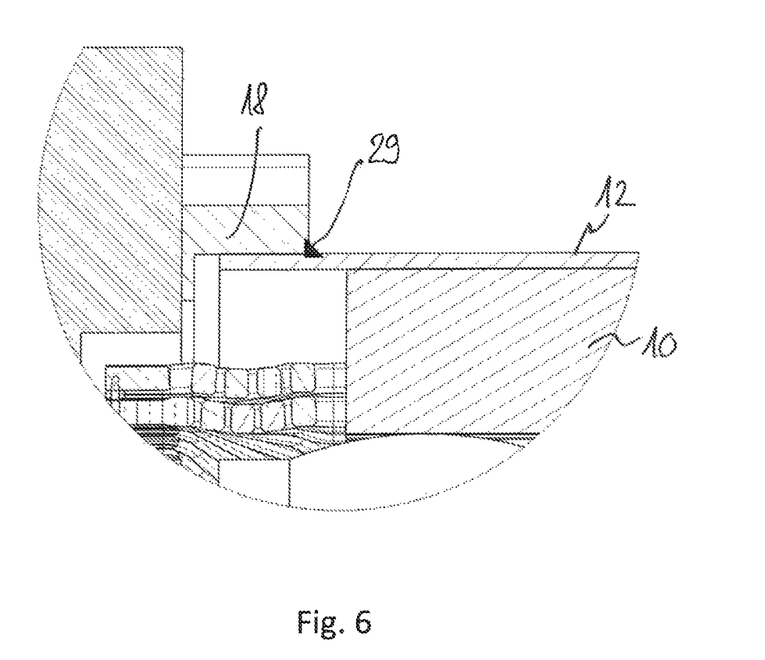

FIG. 6 shows a detail section of the stator housing 12 in the region of the flange 18. The flange 18 is pushed onto the stator housing 12 and connected by substance bonding to the stator housing 12. In the present exemplary embodiment, the substance-bonded connection 29 is a welded connection.

Figure 7:
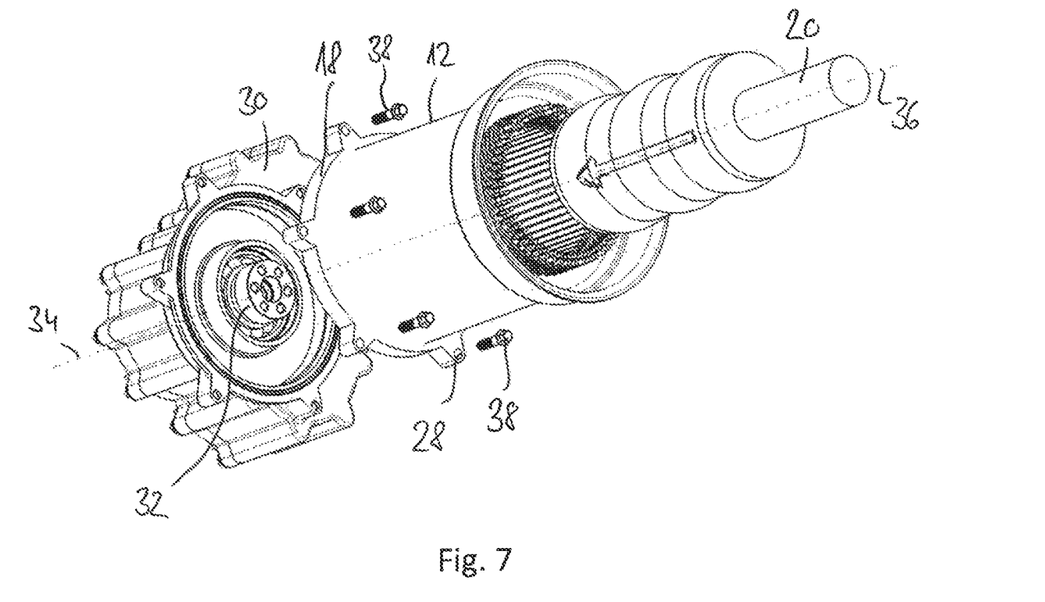
FIGS. 7 and 8 show how the stator is secured to the transmission.
Figure 8:
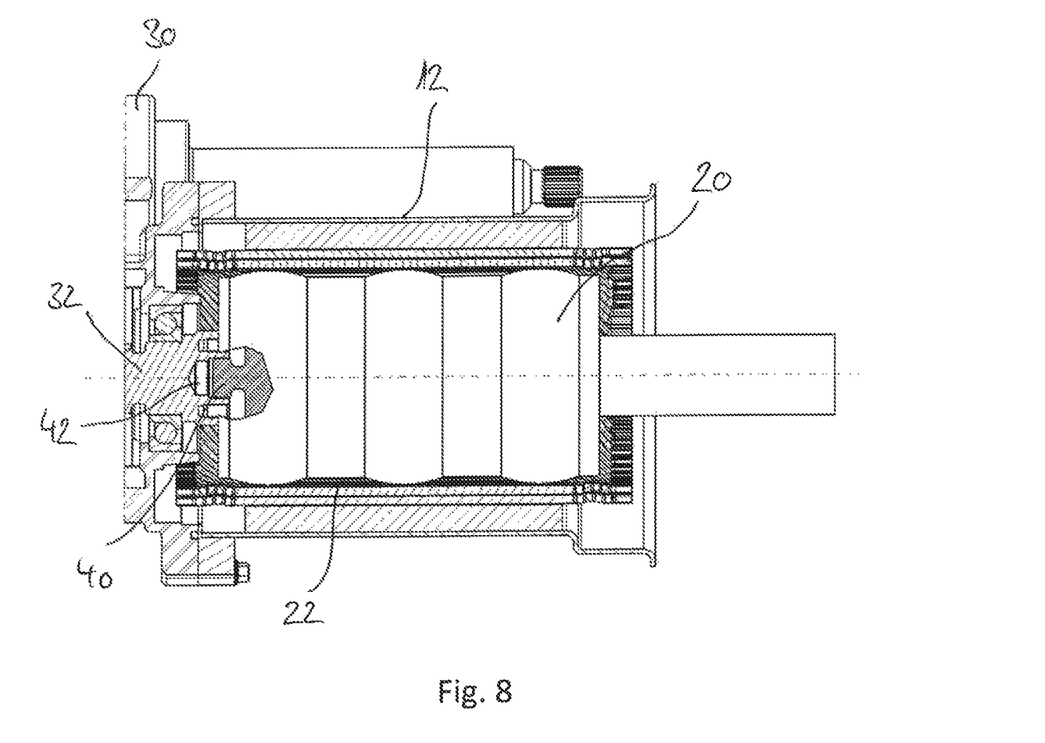

FIGS. 7 to 8 show a fixing and alignment of the stator housing 12 on a transmission 30. The transmission 30 has a transmission input shaft 32. The stator housing 12 is arranged on the transmission 30 via a centering pin 20 such that a longitudinal axis 34 of the transmission input shaft 32 is oriented coaxially to the longitudinal direction 36 of the centering pin 20 arranged in the stator 10. The precise alignment of the stator housing 12 relative to the transmission 30 is a first step in reducing the air gap between a rotor 44, which is inserted in the stator cavity, and the stator 10. The air gap is thus formed in the radial direction between the rotor 44 and the stator 10. After precise alignment, the stator housing 12 is secured or fixed to the transmission 30. In the present exemplary embodiment, this takes place by force fit via fixing device 38 in the form of screws which are guided through fixing openings 28 of the flange 18 and screwed to the transmission 30.

FIG. 8 shows a section through the stator housing 12 placed on the transmission 30. It is evident here that a protrusion 40 of the centering pin 20 engages in or is introduced into a receiver 42 of the transmission input shaft 32, in order to orient the longitudinal direction 36 of the centering pin 20 coaxially to the longitudinal axis 34 of the transmission input shaft 32.

Figure 9:
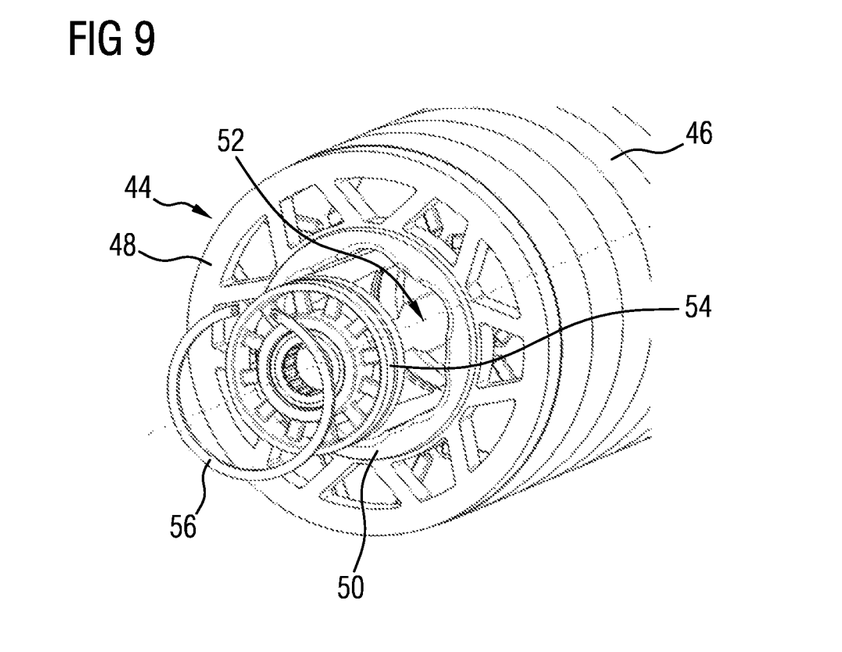
FIG. 9 shows how a bearing device is inserted in the rotor.

FIG. 9 shows a view of a rotor 44 for arrangement in the stator cavity 22. The rotor 44 has a hollow cylindrical sheet stack 46 which includes several sheet stack segments arranged successively in the axial direction. A cover disc 48 is arranged on each end of the stator stack 46 in the axial direction. A rotor hollow shaft 50 is moulded and/or cast onto an inner casing surface of the hollow cylindrical sheet stack 46. In comparison with conventional shafts or rotors, a rotor with a rotor hollow shaft 50 has a reduced weight. The rotor hollow shaft 50, at an axial end, has a hollow shaft opening 52 via which a bearing device 54 is inserted in the hollow shaft and therein fixed via a securing ring 56 to the bearing seat 58 formed in the rotor hollow shaft 50. The bearing device 54 is formed so as to be pivotal.

Figure 10:
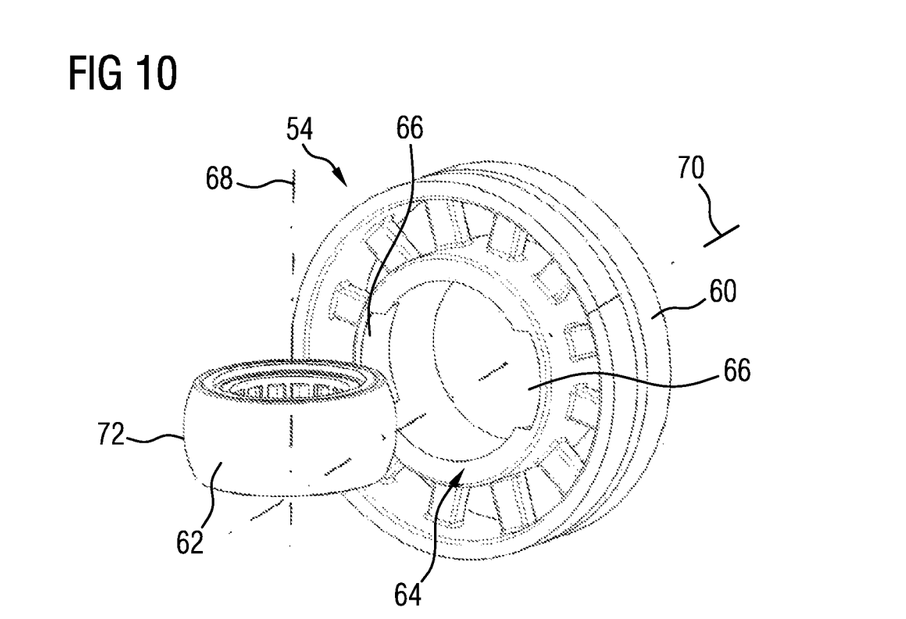
FIGS. 10 to 12 show how a bearing is introduced into a receiving ring of the bearing device
Figure 11:
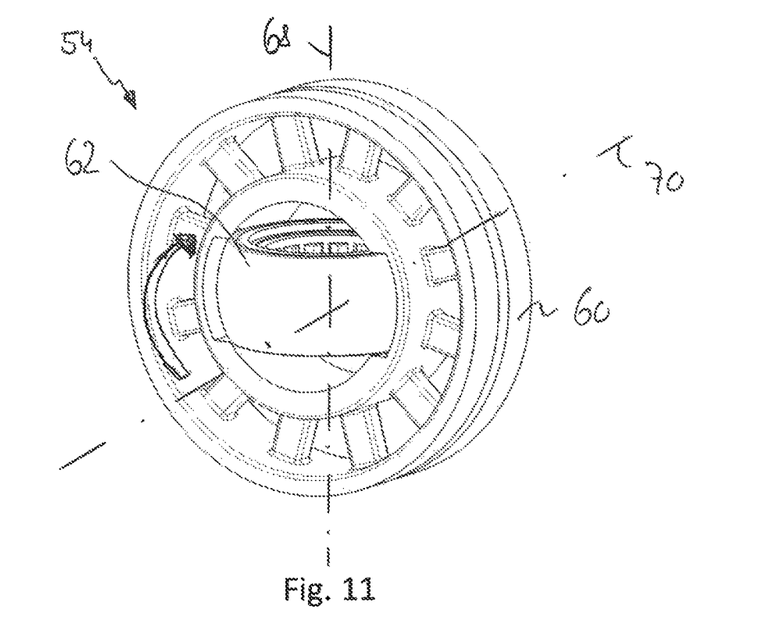
Figure 12:
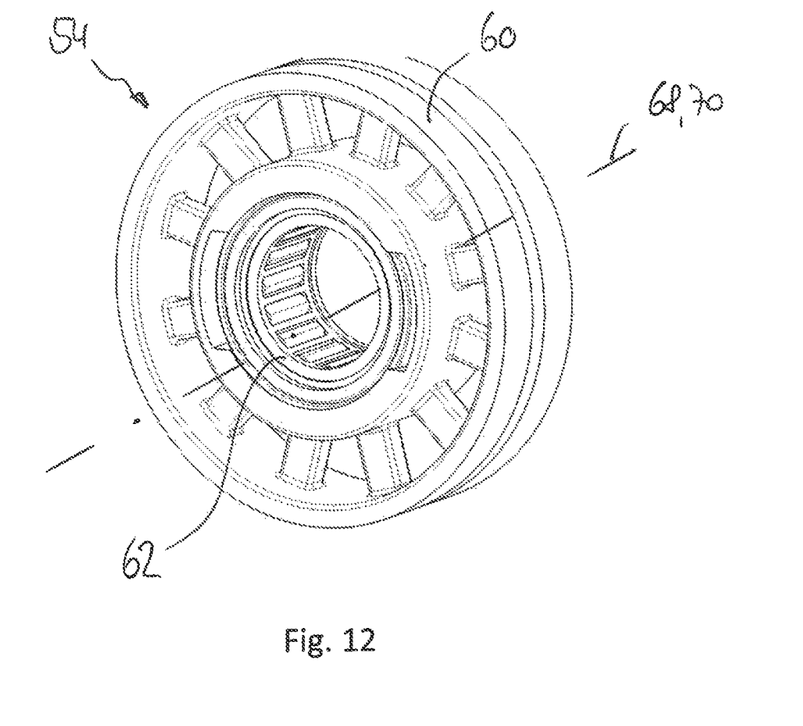

FIGS. 10 to 12 show the design of the bearing device 54 which is formed from a receiving ring 60 and a bearing 62 arranged in the receiving ring 60.

FIG. 10 shows that on an end face 64 oriented in the axial direction of the receiving ring 60, the receiving ring 60 has two receiver grooves 66, spaced apart from one another, for receiving the bearing 62. The bearing 62 is introduced into the receiving ring 60 via a translational movement. Here, a longitudinal axis 68 of the bearing 62 is arranged perpendicularly to a longitudinal axis 70 of the receiving ring 60.

It is furthermore evident that the bearing 62 has a convex form on a casing surface 72 which faces outward in the radial direction. The receiving ring has a concave form on an inside 74 which faces inward in the radial direction.

FIG. 11 shows that the bearing 62 has been introduced into the receiving ring 60 via the translational movement along the receiving grooves 66. The bearing 62 is now pivoted via a pivot movement such that the longitudinal axis 68 of the bearing 62 coincides with the longitudinal axis 70 of the receiving ring 60.

FIG. 12 shows the bearing 62 pivoted in the receiving ring 60, wherein the longitudinal axis 68 of the bearing 62 is the same as the longitudinal axis 70 of the receiving ring 60. In this way, a spherical bearing 62 is provided which may compensate for axial tolerances between the longitudinal axis 34 of the transmission input shaft 32 and a rotor longitudinal axis of the rotor 44.

Figure 13:
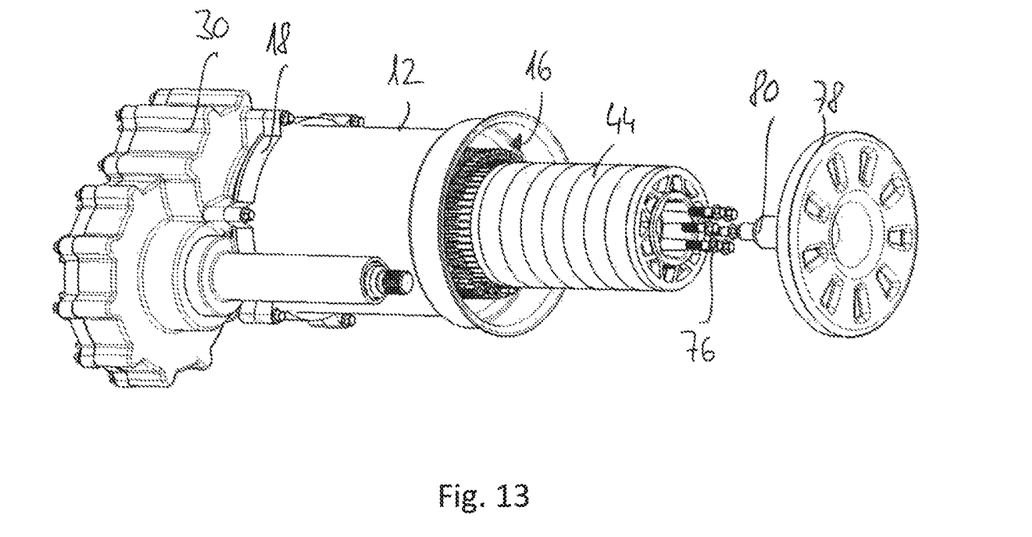
FIG. 13 shows how the rotor is inserted in the stator and the bearing shield closes the stator housing

FIG. 13 shows a view of the stator housing 12 which is attached to the transmission 30 and in which the rotor 44 is introduced into the stator cavity 22 via the receiving opening 16 and connected to the transmission input shaft 32 by force fit via screws 76. Then a bearing shield 78 is placed on the stator housing 12 in order to close the receiving opening 16. On a side facing the rotor 44, the bearing shield 78 has a bearing pin 80 which engages in a rotor cavity 82 of the rotor hollow shaft 50 and in the pivotally attached bearing device 54 which is arranged in the rotor cavity 82, such that the rotor 44 is mounted so as to be rotatable about its rotor longitudinal axis.

Figure 14:
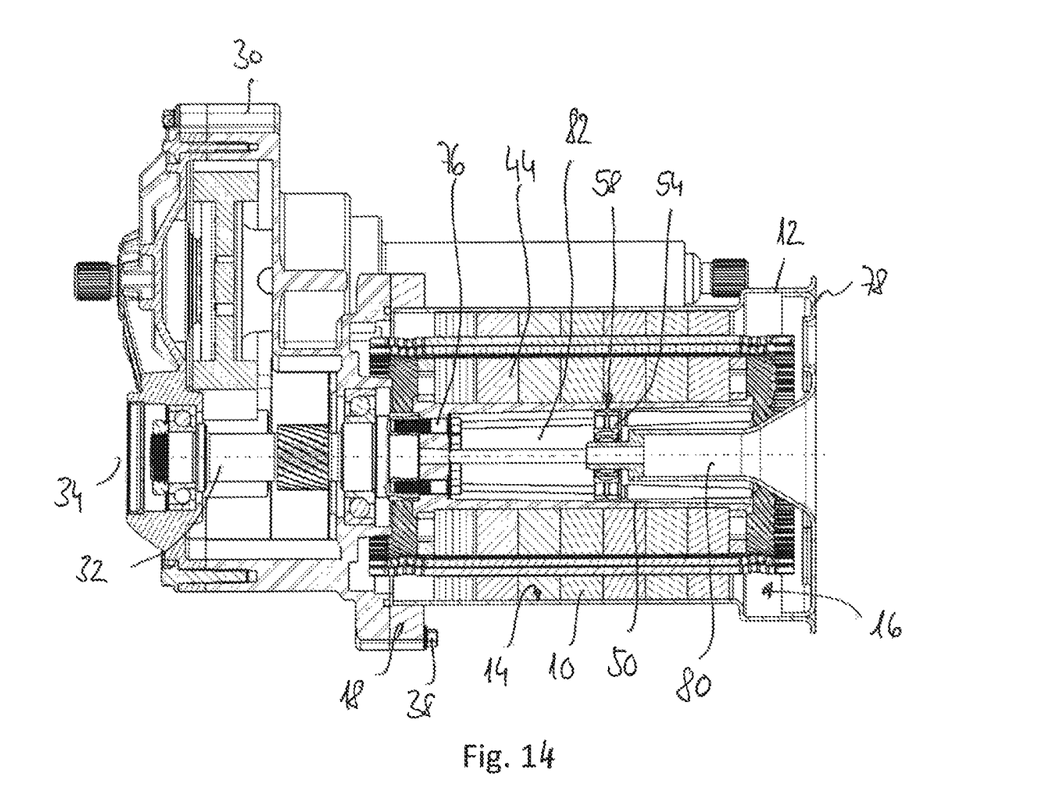
FIG. 14 shows a section through the electric machine.

FIG. 14 shows a section through the transmission 30 and the electric machine including a stator housing 12. By precise alignment of the stator housing 12 relative to the longitudinal axis 34 of the transmission input shaft 32, and by arranging a spherical bearing device 54 in the rotor hollow shaft 50 of the rotor 44, tolerances may be compensated so that the air gap in the radial direction between the rotor 44 and the stator 10 is reduced, such that the power density of the electric machine is increased.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for arranging an electric machine on a transmission, comprising the steps of:
    providing a stator housing which has at least one cylindrical inner casing surface and a receiving opening;
    providing a hollow cylindrical stator having a stator cavity;
    providing a transmission having a transmission input shaft;
    providing a centering pin;
    providing a rotor having a hollow rotor shaft;
    providing a bearing shield having a bearing pin;
    providing a bearing device;
    inserting the hollow cylindrical stator into the stator housing such that the hollow cylindrical stator is rotationally fixed in the stator housing;
    inserting the centering pin into the stator cavity of the hollow cylindrical stator via the receiving opening of the stator housing, and clamping the centering pin in the stator cavity;
    aligning the stator housing with the transmission such that a longitudinal axis of the transmission input shaft mounted in the transmission is oriented coaxially to a longitudinal direction of the centering pin arranged in the hollow cylindrical stator;
    securing the stator housing on the transmission;
    removing the centering pin from the stator cavity;
    inserting the rotor into the stator;
    securing the rotor to the transmission input shaft;
    arranging the bearing device in a rotor cavity; and
    placing the bearing shield in the receiving opening of the stator housing, such that the bearing pin engages in the rotor cavity of the rotor hollow shaft and in the bearing device such that the rotor is mounted so as to be rotatable about a rotor longitudinal axis.

2. The method of claim 1, further comprising the steps of pressing the stator into the stator housing.

3. The method of claim 1, further comprising the steps of:
    inserting the stator into the stator housing; and
    connecting the stator to the stator housing by substance bonding.

4. The method of claim 1, further comprising the steps of:
    providing a flange having a flange face;
    providing an end side of the stator housing which faces away from the receiving opening; and
    before the alignment of the stator housing on the transmission, pushing the end side onto the flange to connect rotationally fixedly thereto, such that a longitudinal axis of the stator is oriented perpendicularly to the flange face which faces the transmission when the stator housing is mounted to the transmission.

5. The method of claim 4, further comprising the steps of connecting the flange and the stator housing together by substance bonding.

6. The method of any of claim 1, further comprising the steps of:
    providing a protrusion formed on an axial end of the centering pin;
    providing a receiver being part of the transmission input shaft; and
    aligning the stator housing on the transmission by engaging the protrusion in the receiver, such that the longitudinal axis of the centering pin is oriented coaxially to the longitudinal axis of the transmission input shaft.

7. The method of any of claim 1, further comprising the steps of:
    providing an inner casing surface of the stator cavity; and
    clamping the centering pin in a radial direction against the inner casing surface of the stator cavity.

8. The method of any of claim 1, further comprising the steps of:
    providing a hollow shaft opening formed on a side of the rotor facing away from the transmission input shaft;
    providing a securing ring;
    inserting the bearing device in the rotor via the hollow shaft opening; and
    fixing the bearing device securely in position via the securing ring.

9. The method of any of claim 1, further comprising the steps of:
    providing a receiving ring being part of the bearing device;
    providing a bearing being part of the bearing device; and
    pivotally arranging the bearing in the receiving ring via a translational movement and a pivot movement.

10. The method of any of claim 1, further comprising the steps of connecting the bearing shield to the stator housing by substance bonding or form fit.

11. The method of any of claim 1, further comprising the steps of providing the transmission to be part of a drive device for a motor vehicle.

* * * * *